United States Patent
Kim et al.

(10) Patent No.: US 10,845,311 B2
(45) Date of Patent: Nov. 24, 2020

(54) FLUORESCENCE LIFETIME MEASUREMENT APPARATUS AND METHOD CAPABLE OF FINDING TWO OR MORE FLUORESCENCE LIFETIME COMPONENTS BY COMPUTING LEAST SQUARE ERROR THROUGH VIRTUAL FLUORESCENCE DISTRIBUTION MODEL FROM SIGNAL COLLECTED IN ANALOG MEAN DELAY METHOD

(71) Applicants: YONSEI UNIVERSITY INDUSTRY FOUNDATION (YONSEI UIF), Seoul (KR); INTEKPLUS CO.,LTD., Daejeon (KR)

(72) Inventors: Dug Young Kim, Seoul (KR); Won Sang Hwang, Seoul (KR); Dong Eun Kim, Gwangmyeong-si (KR); Min Gu Kang, Daejeon (KR)

(73) Assignees: YONSEI UNIVERSITY INDUSTRY FOUNDATION (YONSEI UIF), Seoul (KR); INTEKPLUS CO., LTD., Daejeon (KR)

( * ) Notice: Subject to any disclaimer, the term of this patent is extended or adjusted under 35 U.S.C. 154(b) by 0 days.

(21) Appl. No.: 16/469,664

(22) PCT Filed: Nov. 17, 2017

(86) PCT No.: PCT/KR2017/013140
§ 371 (c)(1),
(2) Date: Jun. 14, 2019

(87) PCT Pub. No.: WO2018/117434
PCT Pub. Date: Jun. 28, 2018

(65) Prior Publication Data
US 2019/0310198 A1    Oct. 10, 2019

(30) Foreign Application Priority Data

Dec. 22, 2016    (KR) .................... 10-2016-0176735

(51) Int. Cl.
*G01N 21/64*    (2006.01)
*G01J 1/44*    (2006.01)

(52) U.S. Cl.
CPC ............ *G01N 21/6458* (2013.01); *G01J 1/44* (2013.01); *G01N 21/6402* (2013.01);
(Continued)

(58) Field of Classification Search
CPC ................ G01J 1/44; G01J 2001/4453; G01J 2001/446; G01J 2001/4466;
(Continued)

(56) References Cited

U.S. PATENT DOCUMENTS 4,855,930 A    8/1989    Chao et al.
5,990,484 A *  11/1999   Ohsuka .............. G01N 21/6408
                                              250/458.1
(Continued)

FOREIGN PATENT DOCUMENTS

JP        9-229859 A     9/1997
JP     2005-121602 A     5/2005
(Continued)

OTHER PUBLICATIONS

Pelet, S., et al., "A Fast Global Fitting Algorithm for Fluorescence Lifetime Imaging Microscopy Based on Image Segmentation", *Biophysical journal*, vol. 87, iesue 4, Oct. 2004 (pp. 2807-2817).
(Continued)

Primary Examiner — Mark R Gaworecki
(74) Attorney, Agent, or Firm — NSIP Law

(57) ABSTRACT

A fluorescence lifetime measurement apparatus according to an embodiment of the present invention includes an illumi-
(Continued)

nation light generation unit configured to generate illumination light, a fluorescence photon detection unit configured to collect a fluorescence signal of fluorescence photons generated by illuminating at least one or more samples including fluorescent molecules with the illumination light; and a measurement unit configured to compute a fluorescence lifetime by applying a least square method to a simulation function and a function of the fluorescence signal.

8 Claims, 2 Drawing Sheets

(52) U.S. Cl.
CPC .... *G01N 21/6408* (2013.01); *G01J 2001/446* (2013.01); *G01J 2001/4453* (2013.01); *G01J 2001/4466* (2013.01)

(58) Field of Classification Search
CPC ........... G01N 21/6402; G01N 21/6408; G01N 21/6458; G01N 21/6486
See application file for complete search history.

(56) References Cited

U.S. PATENT DOCUMENTS

| | | | |
|---|---|---|---|
| 6,690,463 B2* | 2/2004 | Kask | G01J 3/4406 250/458.1 |
| 2007/0197894 A1* | 8/2007 | Jo | G01N 21/6458 600/407 |
| 2009/0184259 A1* | 7/2009 | Ma | G01N 21/6456 250/483.1 |
| 2012/0286171 A1* | 11/2012 | Hoshishima | G01N 21/6408 250/459.1 |
| 2013/0052656 A1 | 2/2013 | Hoshishima et al. | |
| 2015/0053871 A1* | 2/2015 | Grundfest | G01N 21/6486 250/459.1 |

FOREIGN PATENT DOCUMENTS

| | | |
|---|---|---|
| JP | 2015-83958 A | 4/2015 |
| KR | 10-2012-0001533 A | 1/2012 |
| KR | 10-2012-0130772 A | 12/2012 |
| WO | WO 2006/069444 A1 | 7/2006 |
| WO | WO 2012/010884 A1 | 1/2012 |

OTHER PUBLICATIONS

Karpf, Sebastian et al., "Two-photon microscopy using fiber-based nanosecond excitation", *Biomedical optics express*, vol. 7, Issue 7, Mar. 2016 (pp. 2432-2440).

Eibl, Matthias, et al., "Single pulse twe photon fluorescence lifetime imaging (SP-FLIM) with MHz pixel rate", *Biomedical optics express*, vol. 8, No. 7, Jul. 2017 (pp. 3132-3142).

Extended European Search Report dated Oct. 1, 2019 in counterpart European Patent application No. 17882417.3 (10 pages in English).

International Search Report dated Feb. 21, 2018 in counterpart International Patent Application PCT/KR2017/013140 (2 pages in English and 2 pages in Korean).

* cited by examiner

FLUORESCENCE LIFETIME MEASUREMENT APPARATUS AND METHOD CAPABLE OF FINDING TWO OR MORE FLUORESCENCE LIFETIME COMPONENTS BY COMPUTING LEAST SQUARE ERROR THROUGH VIRTUAL FLUORESCENCE DISTRIBUTION MODEL FROM SIGNAL COLLECTED IN ANALOG MEAN DELAY METHOD

CROSS REFERENCE TO RELATED APPLICATIONS

This application is a U.S. National Stage Application of International Application No. PCT/KR2017/013140, filed on Nov. 17, 2017, which claims the benefit under 35 USC 119(a) and 365(b) of Korean Patent Application No. 10-2016-0176735, filed on Dec. 22, 2016, in the Korean Intellectual Property Office, the entire disclosure of which is incorporated herein by reference for all purposes.

TECHNICAL FIELD

The present invention relates to a fluorescence lifetime measurement apparatus and method for measuring a fluorescence lifetime, and more particularly, to a fluorescence lifetime measurement apparatus and method capable of independently measuring two or more mixed samples in the least amount of time.

BACKGROUND ART

Microscopes are classified into first-generation optical microscopes, second-generation electron microscopes, and third-generation scanning probe microscopes and are widely used in medical science, molecular biology, new medicine development, and materials engineering.

Recently, however, a fluorescence lifetime microscope has emerged as the core of research. A fluorescence lifetime microscope is an instrument (FLIM-FRET) which is capable of measuring fluorescence resonance energy transfer (FRET) most accurately. FRET is a phenomenon in which energy is transferred from one phosphor to another without the emission or absorption of light when two phosphors are located at a distance of 10 nm or less. Since phenomena that occur at a scale of several nm or less and thus cannot be seen with conventional optical microscopes can be observed with FRET, there is a growing demand in many life science fields such as cell membrane, deoxyribonucleic acid (DNA), ribonucleic acid (RNA), and protein-protein interaction fields.

In particular, time-correlated single photon counting (TCSPC), which is used as the fluorescence lifetime microscope, senses a response caused by a single photon using a photodetector with a high signal gain, such as a photo multiply tube (PMT) or an avalanche photodiode (APD). The arrival time of a single photon can be precisely measured regardless of how long the width of the shape of the response pulse caused by the single photon is along the time axis. Thus, it is possible to measure a fluorescence lifetime of about 0.1 nanoseconds. When only a single photon is sensed at every measurement, the arrival time of the single photon response may be measured by detecting the arrival time of a rising edge of a measured single photon response. In principle, the accuracy of the measured arrival time is irrelevant to the output pulse width of the photodetector. However, the photodetector with high gain has a fundamental problem of transit time spread (TTS). Typically, the PMT exhibits high time measurement accuracy by a factor of 5 compared to the analog impulse response pulse width in the TCSPC. The arrival time of a single photon counted by this method is utilized to draw a frequency distribution table (histogram) of the time axis by a digital method. After several hundreds to thousands of instances of counting, the frequency distribution table is regarded as the probability distribution function (PDF) of the emission of the fluorescence photons. The fluorescence lifetime is computed through fitting using an exponential decay function.

TCSPC is variously utilized in time division spectroscopy and fluorescence lifetime imaging (FLIM) as a stable measurement method with high sensitivity. However, TCSPC fundamentally has a limitation in measurement time of the single photon counting method. In TCSPC, only one photon may be counted at every measurement period. Even when a large number of fluorescence photons are generated from a large number of fluorescent molecules by an excitation light pulse, photons counted by a counter must be intentionally reduced in intensity so that only one photon is generated for each pulse. If two or more photons are sensed by the counter in a measurement period, in particular, if the arrival times of two photons are so close that they cannot be divided by two pulses, the counter measures only the value of the first arriving photon. In this case, signal loss occurs, and thus the measured fluorescence lifetime becomes shorter than the actual value.

Furthermore, when a large number of samples having two or more fluorescence lifetimes different from each other are mixed even if a single photon is used, it is more difficult to independently measure the fluorescence lifetimes.

DETAILED DESCRIPTION OF THE INVENTION

Technical Problem

According to an embodiment of the present invention, there are provided a fluorescence lifetime measurement apparatus and method capable of independently allowing for a high measurement speed even when two or more fluorescence samples having different fluorescence lifetimes are mixed.

Technical Solution

A fluorescence lifetime measurement apparatus according to an embodiment of the present invention includes an illumination light generation unit configured to generate illumination light, a fluorescence photon detection unit configured to collect a fluorescence signal of fluorescence photons generated by illuminating at least one or more samples including fluorescent molecules with the illumination light, and a measurement unit configured to compute a fluorescence lifetime by applying a least square method to a simulation function and a function of the fluorescence signal.

A fluorescence lifetime measurement method according to an embodiment of the present invention includes a light generation step in which illumination light is generated, an illumination step in which fluorescence photons generated by illuminating at least one or more samples with the illumination light are collected, a conversion step in which the fluorescence photons are converted into a fluorescence signal, and a measurement step in which a fluorescence lifetime is computed by applying a least square method to a simulation function and a function of the fluorescence signal.

Advantageous Effects of the Invention

According to an embodiment of the present invention, even when two or more samples having different fluorescence lifetimes are mixed, it is possible to compute the fluorescence lifetimes of the samples more quickly.

In detail, even when different types of fluorescence signals are emitted, it is possible to separately measure fluorescence lifetimes.

MODE OF THE INVENTION

Advantages and features of the present disclosure and methods of accomplishing the same will be apparent by referring to embodiments described below in detail in connection with the accompanying drawings. The present disclosure may, however, be embodied in different forms and should not be construed as limited to the embodiments set forth herein. Rather, these embodiments are provided so that this disclosure will be thorough and complete and will fully convey the scope of the present invention to those skilled in the art. Therefore, the scope of the disclosure is defined only by the appended claims.

Unless otherwise defined, all terms (including technical and scientific terms) used herein have the same meaning as commonly understood by one of ordinary skill in the art to which this invention belongs. Also, terms such as those defined in commonly-used dictionaries are not to be interpreted in an idealized or overly formal sense unless expressly so defined herein.

Hereinafter, a fluorescence lifetime measurement apparatus 100 according to an embodiment of the present invention will be described with reference to the accompanying drawings.

Figure 1:
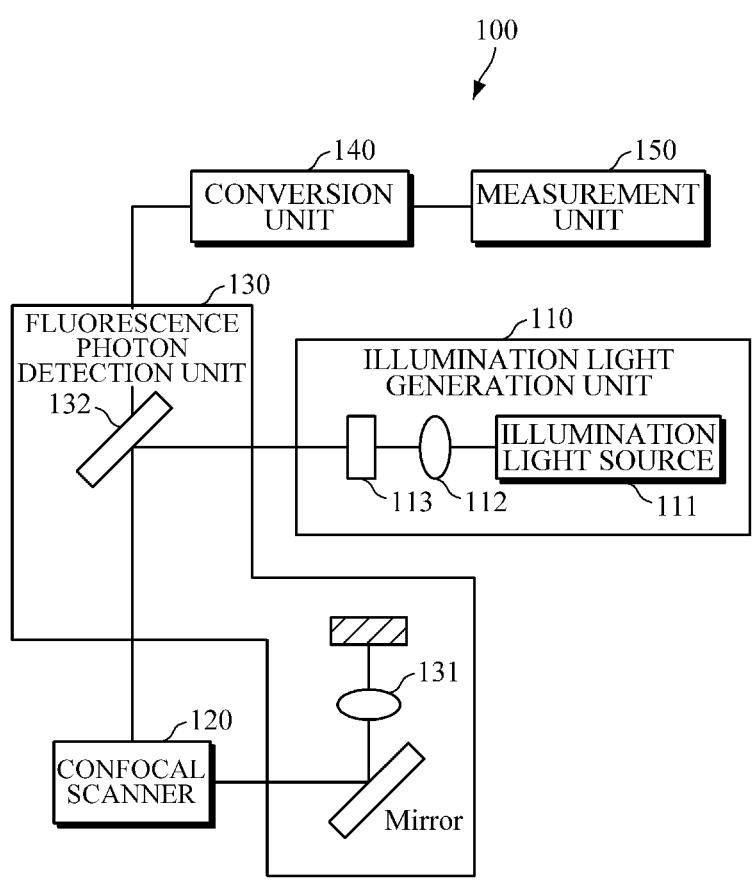
FIG. 1 is a block diagram of a fluorescence lifetime measurement apparatus according to an embodiment of the present invention.

FIG. 1 is a block diagram of the fluorescence lifetime measurement apparatus 100 according to an embodiment of the present invention. Referring to FIG. 1, an illumination light generation unit 110 generates illumination light capable of exciting a sample S. The illumination light is incident in a spatial parallel manner through a collimator 112 in the form of pulses with respect to time.

The incident illumination light passes through a short pass filter (SPF) 113 and then is reflected from a dichroic filter and incident on the sample S through an objective lens 131. The incident illumination light generates fluorescence photons from the sample S.

The generated fluorescence photons are collected by a confocal scanner 120 through the objective lens 131 and then pass through the dichroic filter 132.

Next, the fluorescence photons are amplified and transformed into a fluorescence signal through the conversion unit 140. The amplified fluorescence signal is delivered to a measurement unit 150.

The measurement unit 150 computes a fluorescence lifetime of the fluorescence photons from the delivered fluorescence signal.

The illumination light generation unit 110 has a structure configured to generate illumination light to illuminate a sample S including fluorescent molecules and includes an illumination light source 111.

The illumination light has a pulse width of 100 psec or less and a wavelength ranging from 300 nm to 700 nm. The illumination light source 111 according to an embodiment of the present invention includes a semiconductor laser.

Also, the semiconductor laser may include an electric pulse signal generator having a pulse width of 300 ps or less, a pulse clock unit configured to generate a stable trigger signal, and a semiconductor pulse laser head having a wavelength of 400 nm.

The illumination light generation unit 110 may further include the SPF 113 and the collimator 112 for collecting the illumination light.

The confocal scanner 120 allows for three-dimensional (3D) imaging and thus may measure a change in the sample S corresponding to time or wavelengths of the light in a 3D manner.

The confocal scanner 120 according to an embodiment of the present invention includes a horizontal scanning unit and a vertical scanning unit. The horizontal scanning unit may include a galvanometer mirror and may perform two-dimensional (2D) scanning at a very high speed using the galvanometer mirror. The vertical scanning unit includes motor-driven means or piezoelectric-driven means (PZT). The motor-driven means or piezoelectric-driven means may all be adjusted by an open-loop system or a closed-loop system.

The fluorescence photon detection unit 130 is a module that collects a plurality of fluorescence photons generated by illuminating one or more samples S. The fluorescence photon detection unit 130 may include a fluorescence photon collection lens 131 and the dichroic filter 132 for preventing the conversion unit 140, which will be described below, from receiving the illumination light.

The fluorescence photon collection lens 131 is a lens that collects a large number of fluorescence photons generated from the samples S. The fluorescence photon collection lens 131 may serve as the objective lens.

The dichroic filter 132 is an optical filter that selectively passes the incident illumination light depending on wavelength. The dichroic filter 132 according to an embodiment of the present invention has a characteristic of reflecting a wavelength band corresponding to the illumination light and passing a wavelength band corresponding to the fluorescence photons. However, the passed wavelength band or the reflected wavelength band of the dichroic filter 132 may be adjusted as necessary.

Also, when the illumination light is removed, the fluorescence photons pass through a low pass filter (LPF) and then are focused by a collimator (not shown) of the fluorescence photon detection unit.

The conversion unit 140 is a module that amplifies and converts the fluorescence photons having passed through the dichroic filter 132 into a fluorescence signal. The conversion unit 140 includes a photodetector, an amplifier, and a digitizer.

The photodetector and amplifier according to an embodiment of the present invention may include a photo multiply tube (PMT), an avalanche photodiode (APD) and/or LPF, and an amp.

The photodetector converts the collected fluorescence photons into a fluorescence signal. The fluorescence signal is delivered to the LPF.

The LPF is a filter that passes low frequencies and temporally amplifies the clock signal. The LPF according to an embodiment of the present invention includes an electronic Gaussian low-pass filter (GLPF).

The GLPF removes high-frequency parts to facilitate data processing for the clock signal. GLPF is symmetrically implemented such that there is no ringing. The GLPF decreases the bandwidth of the clock signal to correspond to the bandwidth of the digitizer.

The digitizer performs signal recovery in consideration of illumination light having a small pulse width. Specifically, the digitizer functions as a portion of an AMD measurement unit 150 that collects clock signals and computes a fluorescence lifetime on the basis of the collected clock signals.

The measurement unit 150 is a module for finding a fluorescence lifetime of the fluorescence photons collected from the at least one sample. The measurement unit 150 measures the fluorescence lifetime through the following principle.

The measurement unit 150 may measure the fluorescence lifetime of the at least one or more samples, and the measurement for the one or more samples is performed through the following method.

The most intuitive method for measuring a fluorescence lifetime is a method of entering excitation light having a short pulse form into a sample and measuring a time waveform of emitted fluorescence through a high-speed photodetector. A pulsed laser beam is used as the excitation light having the short pulse width.

In this case, the waveform measured through the photodetector is a form in which the response of the photodetector is convoluted with the exponential decay waveform of the fluorescence. This is expressed as in the following Equation.

$$g(t) = f(t) \otimes h(t) \equiv \int_{-\infty}^{\infty} f(x)h(t-x)dx \quad [\text{Equation 1}]$$

Here, the symbol $\otimes$ indicates convolution, g(t) is a fluorescence signal measured through the AMD method, f(t) is a fluorescence distribution function of a sample, and h(t) is an impulse response function of a measurement system. Specifically, g(t) is a value recovered by performing quantization, sampling, and then interpolation on a measured signal.

First, when the single fluorescence lifetime of the sample is defined as $\tau$, the fluorescence distribution function $f(t)$ may be written as $f(t,\tau)=\exp(-t/\tau)$. In this case, by convoluting $f(t,\tau)=\exp(-t/\tau)$ with impulse response function h(t) of the measurement system, a simulation function $g_c(t,\tau)$, which is a theoretical fluorescence signal function, may be obtained.

$$g_c(t, \tau) = f(t, \tau) \otimes h(t) \equiv \int_{-\infty}^{\infty} f(x, \tau)h(t-x)dx \quad [\text{Equation 2}]$$

Here, in order to compute a difference between the simulation function $g_c(t,\tau)$ and the measured function g(t), a square error $\chi^2(\tau)$ obtained by sampling $g_c(t,\tau)$ and the function g(t) n times at regular intervals may be defined as follows.

$$\chi^2(\tau) \equiv \sum_{k=1}^{n} [g(t_k) - g_c(t_k, \tau)]^2 \quad [\text{Equation 3}]$$

Here, $g(t_k)$ is the measured fluorescence signal function, and $g_c(t_k,\tau)$ is a reference fluorescence signal function. In this case, when the value $\tau$ is found such that the square error $\chi^2(\tau)$ is minimal, $\tau$ becomes the fluorescence lifetime of the sample.

Even when there are two samples to be measured, the fluorescence lifetimes of the samples may be found independently by applying this equation.

As an example, when the fluorescence lifetimes of the two samples are assumed as $\tau_1$ and $\tau_2$, the fluorescence distribution function $f(t)$ is expressed using the following equation.

$$f(t,\alpha,\tau_1,\tau_2)=\alpha*\exp(-t/\tau_1)+(1-\alpha)*\exp(-t/\tau_2) \quad [\text{Equation 4}]$$

Here, $\alpha$ is a constant indicating the ratio of a phosphor having the fluorescence lifetime $\tau_1$ to all of the two samples.

In this case, by convoluting $f(t,\alpha,\tau_1,\tau_2)$ with the impulse response function h(t) of the measurement system, a simulation function $g_c(t,\alpha,\tau_1,\tau_2)$, which is a theoretical fluorescence signal function, may be obtained as follows.

$$g_c(t, \alpha, \tau_1, \tau_2) = \quad [\text{Equation 5}]$$
$$f(t, \alpha, \tau_1, \tau_2) \otimes h(t) \equiv \int_{-\infty}^{\infty} f(x, \alpha, \tau_1, \tau_2)h(t-x)dx$$

Here, in order to compute a difference between the simulation function $g_c(t,\alpha,\tau_1,\tau_2)$ and the measured function $g(t_k)$, a square error $\chi^2(\tau)$ obtained by sampling $g_c(t,\alpha,\tau_1,\tau_2)$ and the function $g(t_k)$ times at regular intervals may be defined as follows.

$$\chi^2(\alpha, \tau_1, \tau_2) \equiv \sum_{k=1}^{n} [g(t_k) - g_c(t_k, \alpha, \tau_1, \tau_2)]^2 \quad [\text{Equation 6}]$$

Here, $g(t_k)$ is a sampling value of the measured fluorescence signal where $t=t_k$, and $g_c(t_k,\alpha,\tau_1,\tau_2)$ is a sampling value of the simulation function, which is the theoretical fluorescence signal function, where $t=t_k$.

In this case, when the values $\alpha$, $\tau_1$, and $\tau_2$ of $\chi^2(\alpha,\tau_1,\tau_2)$ are found such that the square error $\chi^2(\tau)$ is minimal, it is possible to measure the fluorescence lifetimes of the two samples.

A method of finding the roots of $\alpha$, $\tau_1$, and $\tau_2$ such that the square error $\chi^2(\tau)$ is minimal according to an embodiment of the present invention will be described below. The method of finding the roots according to an aspect may use the following algorithm.

$$\vec{X}^{k+1}=\vec{X}^k-((\vec{J}^k)^T(\vec{J}^k))^{-1}(\vec{J}^k)^T\vec{F}^k \quad [\text{Equation 7}]$$

Here, $$\vec{J}^k = \begin{bmatrix} \frac{\partial f_1^k}{\partial X_1^k} & \cdots & \frac{\partial f_1^k}{\partial X_n^k} \\ \vdots & & \vdots \\ \frac{\partial f_m^k}{\partial X_1^k} & \cdots & \frac{\partial f_m^k}{\partial X_n^k} \end{bmatrix}$$

is the Jacobian matrix. The above algorithm is a multi-variable function and can be used when there are many conditions.

The above equation may be derived by the following equation.

$$\sum_i r_i^2 = \sum_i (y_i - g_i(\vec{X}))^2 \qquad \text{[Equation 8]}$$

Here, y is data, g is a model, and $\vec{X}$ is a parameter of the model. When $f_i(\vec{X}) \equiv y_i - g_i(\vec{X})$ is defined, the above equation becomes simultaneous equations for finding the roots of $$f_1(\vec{X}) = 0$$
$$f_2(\vec{X}) = 0$$
$$\vdots$$
$$f_n(\vec{X}) = 0.$$

When $\vec{F} = [f_1, f_2, \ldots, f_m]$ is defined, the above-described equation may be found.

By applying this to the present invention, $\alpha$, $\tau_1$, and $\tau_2$ are found using the least square method such that the square error $\chi^2(\tau)$ is minimal. Here, according to the present invention, the least square method becomes a non-linear least square method because the number of pieces of data is greater than the number of parameters of the model and the model is not linear with respect to the parameters.

$$\vec{X}^{k+1} = \vec{X}^k - ((\vec{J}^k)^T(\vec{J}^k))^{-1}(\vec{J}^k)^T\vec{F}^k \qquad \text{[Equation 9]}$$

In Equation 9, according to the present invention, $\vec{X} = [\tau_1, \tau_2, \alpha]$, $$\vec{F} = \begin{bmatrix} y_1 - g_1(\tau_1, \tau_2, \alpha) \\ \vdots \\ y_m - g_m(\tau_1, \tau_2, \alpha) \end{bmatrix}, \vec{J} = \begin{bmatrix} -\frac{\partial g_1}{\partial \tau_1} & -\frac{\partial g_1}{\partial \tau_2} & -\frac{\partial g_1}{\partial \alpha} \\ \vdots & \vdots & \vdots \\ -\frac{\partial g_m}{\partial \tau_1} & -\frac{\partial g_m}{\partial \tau_2} & -\frac{\partial g_m}{\partial \alpha} \end{bmatrix}, \text{ and}$$

$$g_i(\vec{X}) = g_i(\tau_1, \tau_2, \alpha) = \left[ u(t)[\alpha e^{-t/\tau_1} + (1-\alpha)e^{-t/\tau_2}] \otimes e^{-t^2/\sigma} \right]_{t=t_i}.$$

Here, u(t) is a unit step function, and $e^{-t^2/\sigma}$ is a Gaussian low-pass filter. When the definition of the convolution is utilized, g may be written as follows.

$$g_i(\tau_1, \tau_2, \alpha) = \qquad \text{[Equation 10]}$$
$$\left[ \int_{-\infty}^{\infty} u(t')[\alpha e^{-t'/\tau_1} + (1-\alpha)e^{-t'/\tau_2}]e^{-(t-t')^2/\sigma} dt' \right]_{t=t_i}$$

$$\frac{\partial g}{\partial \tau_1}, \frac{\partial g}{\partial \tau_2}, \text{ and } \frac{\partial g}{\partial \alpha},$$

which are to be applied to the Jacobian matrix, are computed using the following equation.

$$\begin{aligned}
\frac{\partial g_i}{\partial \tau_1} &= \left[ \frac{\partial}{\partial \tau_1} \int_{-\infty}^{\infty} u(t')[\alpha e^{-t'/\tau_1} + (1-\alpha)e^{-t'/\tau_2}]e^{-(t-t')^2/\sigma} dt' \right]_{t=t_i} \qquad \text{[Equation 11]} \\
&= \left[ \int_{-\infty}^{\infty} u(t') \frac{\partial}{\partial \tau_1}[\alpha e^{-t'/\tau_1} + (1-\alpha)e^{-t'/\tau_2}]e^{-(t-t')^2/\sigma} dt' \right]_{t=t_i} \\
&= \left[ \int_{-\infty}^{\infty} \frac{\alpha t'}{\tau_1^2} u(t') e^{-t'/\tau_1} e^{-(t-t')^2/\sigma} dt' \right]_{t=t_i} \\
&= \left[ \left\{ \frac{\alpha t}{\tau_1^2} u(t) e^{-t/\tau_1} \right\} \otimes e^{-t^2/\sigma} \right]_{t=t_i}
\end{aligned}$$

$$\begin{aligned}
\frac{\partial g_i}{\partial \tau_2} &= \left[ \frac{\partial}{\partial \tau_2} \int_{-\infty}^{\infty} u(t')[\alpha e^{-t'/\tau_1} + (1-\alpha)e^{-t'/\tau_2}]e^{-(t-t')^2/\sigma} dt' \right]_{t=t_i} \\
&= \left[ \int_{-\infty}^{\infty} u(t') \frac{\partial}{\partial \tau_2}[\alpha e^{-t'/\tau_1} + (1-\alpha)e^{-t'/\tau_2}]e^{-(t-t')^2/\sigma} dt' \right]_{t=t_i} \\
&= \left[ \int_{-\infty}^{\infty} \frac{(1-\alpha)t'}{\tau_2^2} u(t') e^{-t'/\tau_1} e^{-(t-t')^2/\sigma} dt' \right]_{t=t_i} \\
&= \left[ \left\{ \frac{(1-\alpha)t}{\tau_1^2} u(t) e^{-t/\tau_1} \right\} \otimes e^{-t^2/\sigma} \right]_{t=t_i}
\end{aligned}$$

$$\begin{aligned}
\frac{\partial g_i}{\partial \alpha} &= \left[ \frac{\partial}{\partial \alpha} \int_{-\infty}^{\infty} u(t')[\alpha e^{-t'/\tau_1} + (1-\alpha)e^{-t'/\tau_2}]e^{-(t-t')^2/\sigma} dt' \right]_{t=t_i} \\
&= \left[ \int_{-\infty}^{\infty} u(t') \frac{\partial}{\partial \alpha}[\alpha e^{-t'/\tau_1} + (1-\alpha)e^{-t'/\tau_2}]e^{-(t-t')^2/\sigma} dt' \right]_{t=t_i} \\
&= \left[ \int_{-\infty}^{\infty} u(t') e^{-t'/\tau_1} e^{-(t-t')^2/\sigma} dt' \right]_{t=t_i} \\
&= \left[ \{u(t) e^{-t/\tau_1}\} \otimes e^{-t^2/\sigma} \right]_{t=t_i}
\end{aligned}$$

That is, since $\alpha$, $\tau_1$, and $\tau_2$ may be found through the above equation such that the square error $\chi^2(\tau)$ is minimal, the fluorescence lifetimes of the two fluorescence samples may be found.

According to the conventional average delay method, only the average of the two fluorescence lifetimes may be obtained using the computation equation, and thus it is not possible to independently obtain fluorescence lifetimes of mixed samples. On the contrary, by using the above method, it is possible to independently calculate fluorescence lifetimes of mixed samples.

Furthermore, by using the above method, it is also possible to find fluorescence lifetimes of three, four, or more fluorescence samples.

However, the method of finding $\alpha$, $\tau_1$, and $\tau_2$ such that the square error $\chi^2(\tau)$ is minimal is not limited thereto. Any method may be applied as long as the method can find $\alpha$, $\tau_1$, and $\tau_2$ such that the square error $\chi^2(\tau)$ is minimal.

The configuration of the fluorescence lifetime measurement apparatus 100 according to an embodiment of the present invention has been described so far. A fluorescence lifetime measurement method 200 according to an embodiment of the present invention will be described below. The fluorescence lifetime measurement method 200 consists of steps processed by the fluorescence lifetime measurement apparatus 100 shown in FIG. 1. Therefore, the content overlapping with those described above will be omitted, and the omitted content may also be applied to the fluorescence lifetime measurement method 200 according to an embodiment of the present invention.

Figure 2:
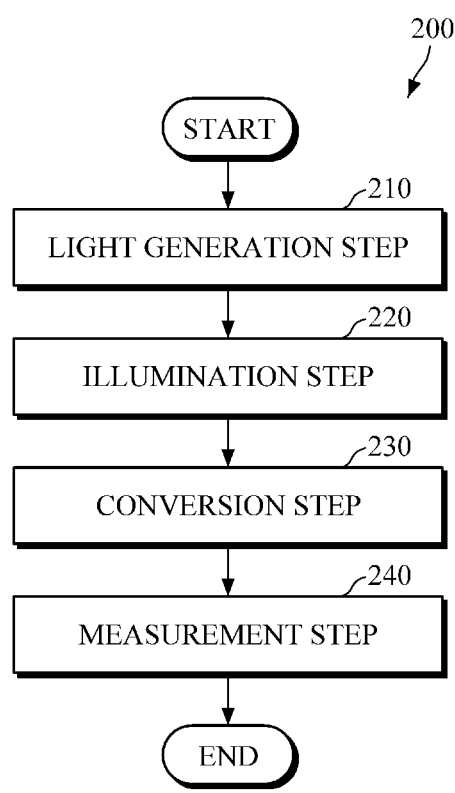
FIG. 2 is a flowchart of a fluorescence lifetime measurement method according to an embodiment of the present invention.

FIG. 2 is a flowchart of the fluorescence lifetime measurement method 200 according to an embodiment of the present invention.

In a light generation step 210, at least one or more samples S having different fluorescence lifetimes are prepared for the fluorescence lifetime measurement apparatus 100 and illumination light is generated to illuminate the samples S.

In an illumination step 220, the sample S is illuminated with the illumination light. In this case, fluorescence photons generated from the samples S are detected through the fluorescence photon collection unit.

In a conversion step 230, the collected fluorescence photons are amplified and converted into a fluorescence signal.

In a measurement step 240, a fluorescence lifetime is computed by applying the least square method to a simulation function and a function of the fluorescence signal. The function of the fluorescence signal, the simulation function, and the least square method are based on the above-described principles.

The invention claimed is:

1. A fluorescence lifetime measurement apparatus comprising:
an illumination light generation unit configured to generate illumination light;
a fluorescence photon detection unit configured to collect fluorescence photons generated by illuminating at least one or more samples including fluorescent molecules with the illumination light;
a conversion unit configured to amplify and convert the fluorescence photons into a fluorescence signal; and
a measurement unit configured to compute a fluorescence lifetime by applying at least square method to a simulation function and a function of the fluorescence signal,
wherein when it is assumed that the fluorescence lifetime of the sample is $\tau$, a fluorescence distribution function of the sample is $f(t)$, and a response function of the fluorescence lifetime measurement apparatus is $h(t)$, the simulation function $g_c(t,\tau)$ is computed using the following equation:

$$g_c(t, \tau) = f(t, \tau) \otimes h(t) \equiv \int_{-\infty}^{\infty} f(x, \tau) h(t - x) dx.$$

2. The fluorescence lifetime measurement apparatus of claim 1, wherein when a measurement function of the fluorescence signal is $g(t)$, a square $\chi^2(\tau)$ of the least square method is computed using the following equation:

$$\chi^2(\tau) \equiv \sum_{k=1}^{n} [g(t_k) - g_c(t_k, \tau)]^2.$$

3. A fluorescence lifetime measurement apparatus comprising:
an illumination light generation unit configured to generate illumination light;
a fluorescence photon detection unit configured to collect fluorescence photons generated by illuminating at least one or more samples including fluorescent molecules with the illumination light;
a conversion unit configured to amplify and convert the fluorescence photons into a fluorescence signal; and
a measurement unit configured to compute a fluorescence lifetime by applying at least square method to a simulation function and a function of the fluorescence signal, wherein when fluorescence lifetimes of the samples are $\tau_1$ and $\tau_2$, a ratio of a sample having the fluorescence lifetime $\tau_1$ to an entirety of the samples is $\alpha$, a fluorescence distribution function of the samples is $f(t,\alpha,\tau_1,\tau_2)$, and a response function of the fluorescence lifetime measurement apparatus is $h(t)$, the simulation function $g_c(t,\alpha,\tau_1,\tau_2)$ is computed using the following equation:

$$g_c(t, \alpha, \tau_1, \tau_2) = f(t, \alpha, \tau_1, \tau_2) \otimes h(t) \equiv \int_{-\infty}^{\infty} f(x, \alpha, \tau_1, \tau_2) h(t - x) dx.$$

4. The fluorescence lifetime measurement apparatus of claim 3, wherein when a measurement function of the fluorescence signal is $g(t)$, a square $\chi^2(\tau)$ of the least square method is computed using the following equation:

$$\chi^2(\alpha, \tau_1, \tau_2) \equiv \sum_{k=1}^{n} [g(t_k) - g_c(t_k, \alpha, \tau_1, \tau_2)]^2.$$

5. A fluorescence lifetime measurement method comprising:
a light generation step in which illumination light is generated;
an illumination step in which fluorescence photons generated by illuminating at least one or more samples with the illumination light are collected;
a conversion step in which the fluorescence photons are converted into a fluorescence signal; and a measurement step in which a fluorescence lifetime is computed by applying a least square method to a simulation function and a function of the fluorescence signal, wherein when the fluorescence lifetime of the sample is $\tau$, a fluorescence distribution function of the sample is $f(t)$, and a response function of a fluorescence lifetime measurement apparatus is $h(t)$ in the measurement step, the simulation function $g_c(t,\tau)$ is computed using the following equation:

$$g_c(t, \tau) = f(t, \tau) \otimes h(t) \equiv \int_{-\infty}^{\infty} f(x, \tau) h(t - x) dx.$$

6. The fluorescence lifetime measurement method of claim 5, wherein when a measurement function of the fluorescence signal is $g(t)$ in the measurement step, a square $\chi^2$ of the least square method is computed using the following equation:

$$\chi^2(\tau) \equiv \sum_{k=1}^{n} [g(t_k) - g_c(t_k, \tau)]^2.$$

7. A fluorescence lifetime measurement method comprising:
- a light generation step in which illumination light is generated;
- an illumination step in which fluorescence photons generated by illuminating at least one or more samples with the illumination light are collected;
- a conversion step in which the fluorescence photons are converted into a fluorescence signal; and
- a measurement step in which a fluorescence lifetime is computed by applying a least square method to a simulation function and a function of the fluorescence signal, wherein when fluorescence lifetimes of the samples are $\tau_1$ and $\tau_2$, a ratio of a sample having the fluorescence lifetime $\tau_1$ to an entirety of the samples is $\alpha$, a fluorescence distribution function of the samples is $f(t,\alpha,\tau_1,\tau_2)$, and a response function of the measurement apparatus is $h(t)$ in the measurement step, the simulation function $g_c(t,\alpha,\tau_1,\tau_2)$ is computed using the following equation:

$$g_c(t, \alpha, \tau_1, \tau_2) = f(t, \alpha, \tau_1, \tau_2) \otimes h(t) \equiv \int_{-\infty}^{\infty} f(x, \alpha, \tau_1, \tau_2) h(t - x) dx.$$

8. The fluorescence lifetime measurement method of claim 7, wherein when a measurement function of the fluorescence signal is $g(t)$ in the measurement step, a square $\chi^2$ of the least square method is computed using the following equation:

$$\chi^2(\alpha, \tau_1, \tau_2) \equiv \sum_{k=1}^{n} [g(t_k) - g_c(t_k, \alpha, \tau_1, \tau_2)]^2.$$

* * * * *